United States Patent [19]
DeLuca et al.

[11] Patent Number: 5,128,665
[45] Date of Patent: Jul. 7, 1992

[54] SELECTIVE CALL SIGNALLING SYSTEM

[75] Inventors: Michael J. DeLuca; Gregory O. Snowden, both of Boca Raton; Robert J. Schwendeman, Pompano Beach; Leon Jasinski, Ft. Lauderdale, all of Fla.

[73] Assignee: Motorola, Inc., Schaumburg, Ill.

[21] Appl. No.: 701,339

[22] Filed: May 10, 1991

Related U.S. Application Data

[63] Continuation of Ser. No. 396,189, Aug. 21, 1989, abandoned.

[51] Int. Cl.⁵ .............................................. G98B 5/22
[52] U.S. Cl. .......................... 340/825.47; 340/825.48
[58] Field of Search ................... 340/825.44–825.48; 370/82, 83

[56] References Cited

U.S. PATENT DOCUMENTS

| | | | |
|---|---|---|---|
| 4,298,978 | 11/1981 | Nakamura | 370/82 X |
| 4,369,443 | 1/1983 | Giallanza et al. | 340/825.47 |
| 4,427,980 | 1/1984 | Fennell et al. | 340/825.47 X |
| 4,431,991 | 2/1984 | Bailey et al. | 340/825.47 X |
| 4,519,068 | 5/1985 | Krebs et al. | 370/82 |
| 4,688,035 | 8/1987 | Gray et al. | 370/82 X |

Primary Examiner—Ulysses Weldon
Attorney, Agent, or Firm—Daniel R. Collopy; Vincent B. Ingrassia; William E. Koch

[57] ABSTRACT

A paging system has a signal for transmitting a variable amount of messages to paging receivers. The signal has a synchronization signal, an address field, an information and a boundary signal indicative of the boundary between the address field and the information field. Each message has addresses which are included within the address field and may have message information which is included in the information field. The information field includes two portions, a first portion having a plurality of packets for holding a predetermined amount of information and a second portion for holding a variable amount of information. If the information associated with a messasge is less than the predetermined amount, the message information is stored in the first portion of the information field. If the message information is greater than the predetermined amount, it is stored in the first and second portions of information field and a vector signal indicating the location of the message information is stored in the first information field. The first portion further includes at least one check signal which provides parity for a plurality of packets. Methods of generating the message signal, receiving a message, displaying a message and conserving power during the reception of a message are described.

18 Claims, 8 Drawing Sheets

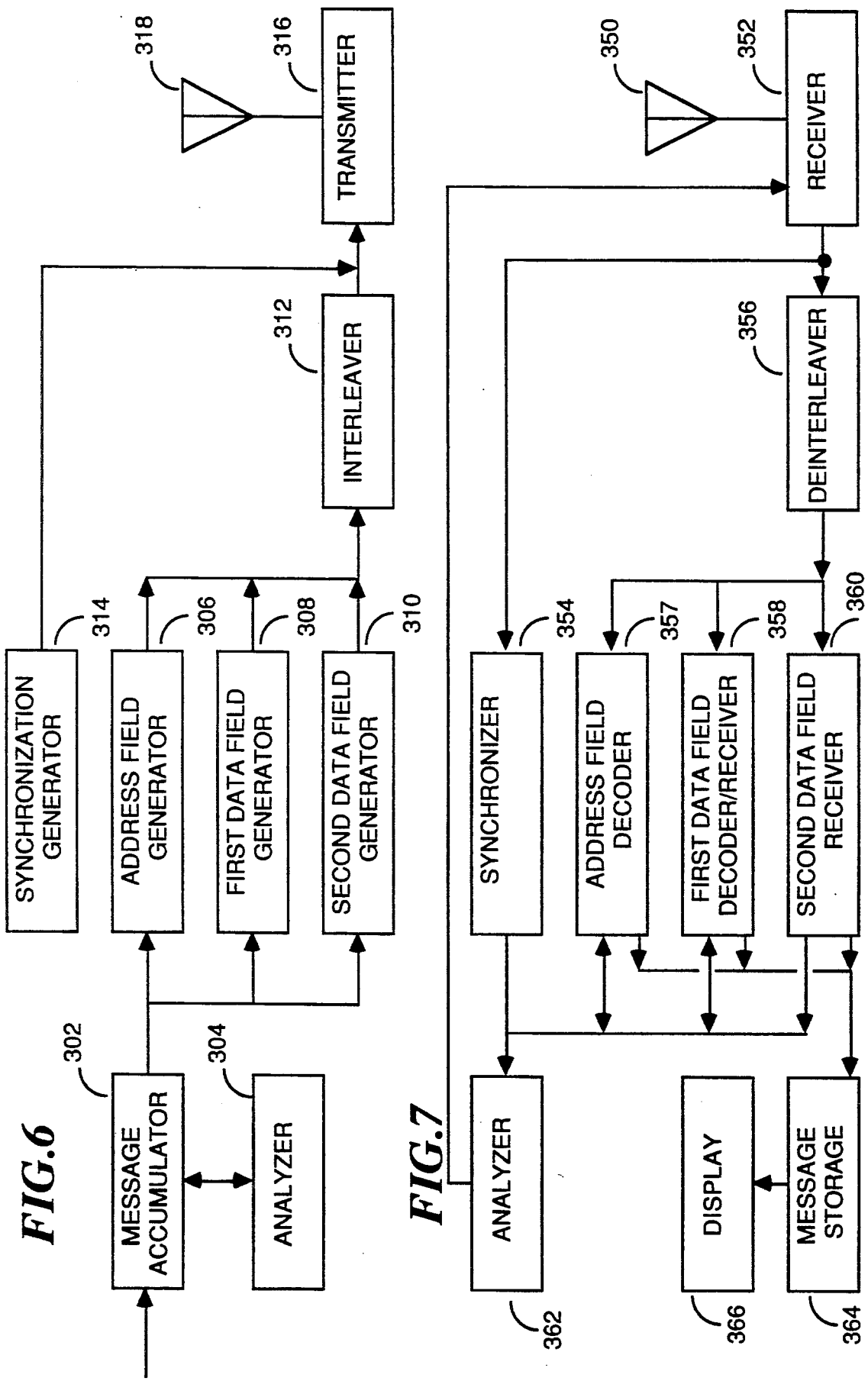

SELECTIVE CALL SIGNALLING SYSTEM

This is a continuation of application Ser. No. 07/396,189, filed Aug. 21, 1989, now abandoned.

BACKGROUND OF THE INVENTION

This invention generally relates to the area of signalling protocol systems. In particular, this invention relates to the area of a signalling protocol used with a paging system having a transmitter and a plurality of portable selective call receivers such as paging receivers.

A signalling protocol developed by Great Britain's Post Office Code Advisory Group (POCSAG) is widely used in paging systems. Also, the Golay Sequential Code (GSC) has enjoyed a number of years of satisfactory use in paging systems the world over. However, the expanding market for paging receivers now requires a signalling system which communicates message information with less overhead than prior art systems.

The POCSAG protocol has overhead which diminishes its ability to communicate information. POCSAG reserves one information bit in every one of the 32,21 BCH message information words to establish the type of information included therein. The bit being in a first logic state indicates address information, and the second state indicates message information is contained within the word. Thus, of 21 information bits in the 32,21 word, one bit, or about 5% of the information, is used simply to indicate the type of information contained within the remaining 20 bits. Being as this bit does not contribute to the actual message information, it is overhead. A second type of overhead is a synchronization word inserted between every sixteen message information words. The synchronization word was used in order to maintain synchronization during the transmission of the protocol. However, advances in the state of the art in synchronization of paging receivers has eliminated the for the sync code. Thus, the sync code occurring as one of every seventeen words, about 6% of the words, is no longer necessary and is also considered overhead. A third type of overhead occurs with the transmission of data messages. Of the data messages, telephone numbers are most often communicated. A formatted ten-digit telephone number uses one address word, three data words and an idle codeword. The idle codeword communicates no message information but acts as a separation signal between data messages. Thus, of the five words, one address, three data and one idle, the idle codeword provides no message information and is thus considered overhead. Thus, the overhead of the idle codeword can typically be 20%. Therefore, much efficiency can be gained with an improved signalling protocol.

The POCSAG protocol additionally suffers from the lack of ability to indicate in advance the occurrence of addresses. Since an address can occur almost anywhere within a transmission, paging receivers are required to search for address information when message information is transmitted. Furthermore, the POCSAG protocol suffers from a finite probability, that bit errors occurring in the message may cause the message information to be falsely interpreted. This is commonly considered a "false". It is desirable to provide for the reduction of falsely interpreting message information.

The GSC protocol has similar overhead signals and suffers from similar protocol problems.

SUMMARY OF THE INVENTION

Thus, it is an object of the invention to resolve the aforementioned problems.

It is an object of the present invention to provide a method for generating and receiving a message signal which resolves the aforementioned problems.

In accordance with the present invention, a method of communicating a message signal having a plurality of messages for reception by a plurality of selective call receivers, the method comprises the steps of:
  (a) accumulating a plurality of data messages, each data message comprising an address signal identifying a selective call receiver, and an information signal having message information;
  (b) grouping the address signals into an address field;
  (c) grouping the information signals into an information field;
  (d) generating a boundary signal indicative of the boundary between the address field and the information field; and
  (e) transmitting the address field, the data field and the boundary signal.

It is an object of the invention to provide a method for receiving a signal generated in accordance with the aforementioned method.

In accordance with the present invention, a method of displaying a message in a format having a multiplicity of characters comprises the steps of:
  receiving a message signal having a format signal included therein and a plurality of characters;
  combining a predetermined character in a predetermined location with the plurality of characters in response to the format signal; and
  displaying the message.

In accordance with the present invention, a method of receiving a message by a selective call receiver having a receiving means, the message contained within a message signal having a plurality of messages for reception by a plurality of selective call receivers, a message having an address signal, a related information signal having at least a portion separated from the address signal and a vector signal indicating the occurrence of the portion of the related information signal, the method comprises the steps of:
  receiving an address signal;
  determining if the address signal matches a predetermined address signal;
  receiving the vector signal in response to the determination;
  deactivating the receiving means after receiving the vector signal; and
  activating the receiving means prior to the occurrence of the portion of the related information signal.

BRIEF DESCRIPTION OF THE DRAWINGS

FIG. 6 shows a block diagram of a transmitter for generating a paging signal in accordance with the present invention.

FIG. 7 shows a block diagram of a paging receiver operating in accordance with the present invention.

DESCRIPTION OF A PREFERRED EMBODIMENT

Figure 1:
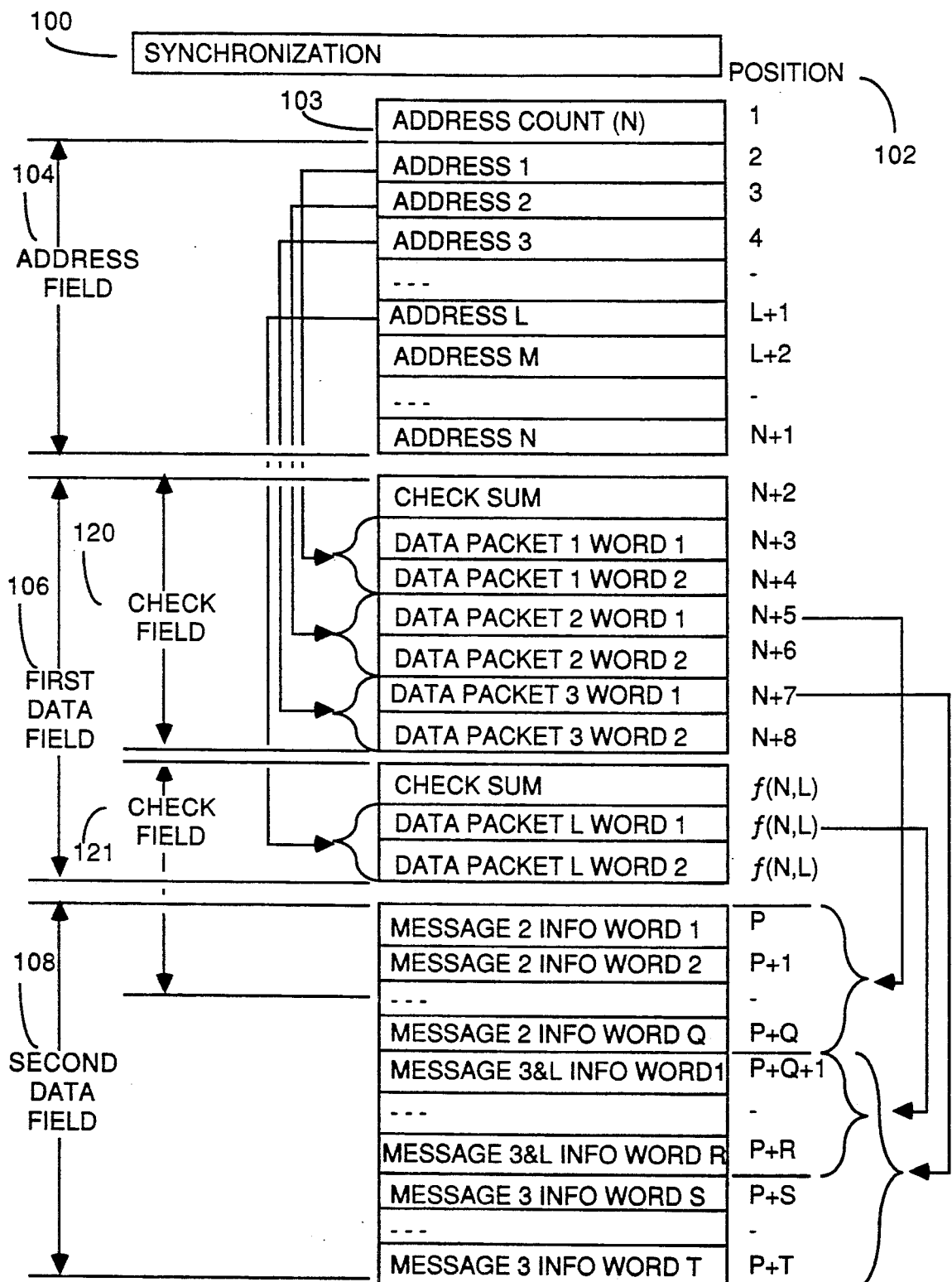
FIG. 1 shows the overall structure of the protocol in accordance with the present invention.

FIG. 1 shows the overall structure of the protocol in accordance with the present invention. The protocol begins with a synchronization word 100 which provides bit and frame synchronization signals which may be similar to the POCSAG preamble signal and first sync code. Providing for such signals is well known to those familiar with the art. The synchronization signal may additionally include group identification signals identifying selected group of pagers which are to decode the subsequent information. Following synchronization signal 100 is a number of information words of predetermined structure. The position of each information word relative to the synchronization signal is shown by position column 102. In position 1 is an information word having a boundary signal which indicates a division between an address field and a data field. In an embodiment of the invention, the boundary signal comprises an address count 103 signal which 103 defines address field 104. The address count 103 signal has a value of "N" which indicates the number of words in the address field, or alternately, indicates the end of the address field and the beginning of data field 106,108. Following address field 104 is a data field divided into two portions. First data field 106 may contain message information for addresses within the address field. Following first data field 106 is second data field 108 which may contain additional message information.

The address field 104 has at least two types of addresses: tone only addresses and data addresses. The message related to the tone only address is the address itself and thus has no other information associated with it. The message related to a data address is included within the first data field 106, or the first and second data fields 106 and 108, depending upon the message. Typically, a numeric message will be contained within the first data field 106, and an alphanumeric or long numeric message will be contained within the first 106 and second 108 data fields.

In one embodiment, addresses with related data messages are positioned within the first portion of the address field, and tone only addresses are in the second portion of the address field. Addresses in positions 1 through L are data message addresses and are thus positioned in the first portion of the address field. Addresses M through N are tone only messages and are thus positioned within the second portion of the address field. The number of tone only and data addresses is variable, and the total number of addresses in the address field is also variable, thus providing flexibility in the varying demand for paging messaging.

Address count signal 103 further indicates the beginning position of the first data field 106. The first data field comprises a number of check fields 120 and 121. Each check field begins with a parity checksum word and includes three data packets, each data packet occupies two words. The information related to address 1, which is in position 2, is included within data packet 1, which is in positions N+3 and N+4. The position of a data packet is associated with the position of an address and value of the address count signal. Similarly, the information related to address 2, through address L, is included within data packets 2, through data packet L. Note that the tone only messages, which are in positions L+2 through N+1, require no associated data packet.

An example of how the location of a data packet associated with an address is determined is provided. In one embodiment, the first word after the synchronization signal is a word including the boundary signal which contains the address count. The address 103 count has a value of N indicating that there are N words in the address field. Since there is one word per address, it follows that there are N addresses in the address field. Thus, the address field 104 ends N+1 words after the synchronization signal. The first data field 106 begins N+2 words after the synchronization signal and the first word is a checksum word. The next two words comprise data packet 1, which has information related to the address 1, and are N+3 and N+4 words after the synchronization signal. Similarly, data packet 2 is associated with address 2 and is located N+5 and N+6 words after the synchronization signal.

In a generalized form, if an address of a data message occurs in a position X, and the address count has a value of N, the data packet associated with an address may be determined with the following equation:

Data Packet Beginning Position =

$$N + \text{INTEGER}\left(\frac{7X - 5}{3}\right)$$

Such a calculation may be readily made by a paging receiver during the reception of a message.

Thus, the protocol of FIG. 1 provides an efficient way to associate addresses with data packets. The location of every data packet is a function of the position X of the address relative to the synchronization signal and a transmitted value N indicating the boundary location of the end of the address field. The value N is used by every message thus providing for further protocol efficiency.

Note that in an alternate embodiment, the position of the data and tone only addresses within the address field may be reversed. Thus, data packet 1 would be related to the address in position N+1 and so on until data packet L which would be related to the address in position N+1-L.

In yet another embodiment, the address field may begin immediately after the synchronization signal and the boundary signal interposed between the address and data fields. In this embodiment, the boundary signal could comprise a predetermined codeword.

In still another embodiment, a bit in each codeword could indicate if the codeword occurred in the address field or data field. For example, in this embodiment, the address count in position 1 could be eliminated, and codewords in positions 1 through N+1 (the address field) could have the first bit set, and codewords in positions N+2 through P+T (the data field) could have the first bit clear, thereby indicating address and data fields. Thus, in this embodiment, the boundary signal is distributed through the codewords within the message signal.

Data packets are configured to optimally communicate numeric telephone number messages, which is the bulk of paging messaging. The typical numeric message may be contained entirely within an address and a data packet. In the event that more information is necessary for the data message, such as an alpha numeric message, the data packet provides a vector signal indicative of the location of the message within second data field 108. In addition to the vector signal, the data packet may also contain some message information. This has the advantage of only supplying vector signals with messages that are long, thus the relative overhead of the vector signal is minimized.

Referring to FIG. 1, data packet 2 includes a vector signal which identifies the position of message information associated with address 2. The message information is in second data field 108 and is in position P through P+Q. Address 2 has Q words of message information in the second data field, and the beginning position of the message is P words after the synchronization signal. Since Q is a variable, this method provides for associating any amount of message information with an address.

Additionally, this method allows addresses to share information in the second data field. Such an application would be if the second data field contained a series of stock market price quotations, companies A, B ◯ C, for example. A first message would include a portion of the stock quotations, companies A ◯ B, and a second message would include a second overlapping portion of the stock quotations companies A, B ◯ C. Referring to FIG. 1, address L has an associated data packet L which has a vector signal indicating that message information words associated with address L is in positions P+Q+1 through P+R. Additionally, address 3 has an associated data packet 3 which has a vector signal indicating that message information words associated with address 3 is in positions P+Q+1 through P+T. Thus, the message information associated with address L is also associated with address 3. Address 3 further receives additional message information within words in positions P+S through P+T. It should be appreciated that a number of variations are possible with this invention. For example, the vector signal could begin message information for address 3 in a position between P and Q, thereby providing each message with unique and common message information. Alternately, the vector signal could end message information for address 3 at position P+R, thereby providing each message with the same message information. Additionally, more than two addresses may have common message information in the second data field thereby providing a group call function. Furthermore, message information in the second data field may be ordered in any sequence and need not correspond to the sequence of the associated address within the address field.

Figure 2:
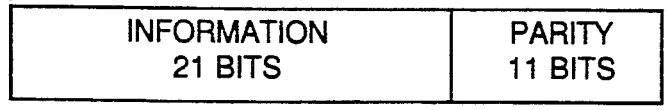
FIG. 2 shows the structure of the codeword used in accordance with the present invention.

As previously indicated, the information within the protocol is included within codewords. The structure of the codeword is the 31,21 BCH extended codeword (32,21) which provides for error detection and correction. FIG. 2 shows the structure of this codeword. It includes 21 information bits and 10 parity bits calculated by a well known BCH generator polynomial. An eleventh parity bit establishes even parity on the 31 bits. In the preferred embodiment, all words after the synchronization signal are of this structure. It should be appreciated that an alternate embodiment may use a different structure codeword.

Figure 3:
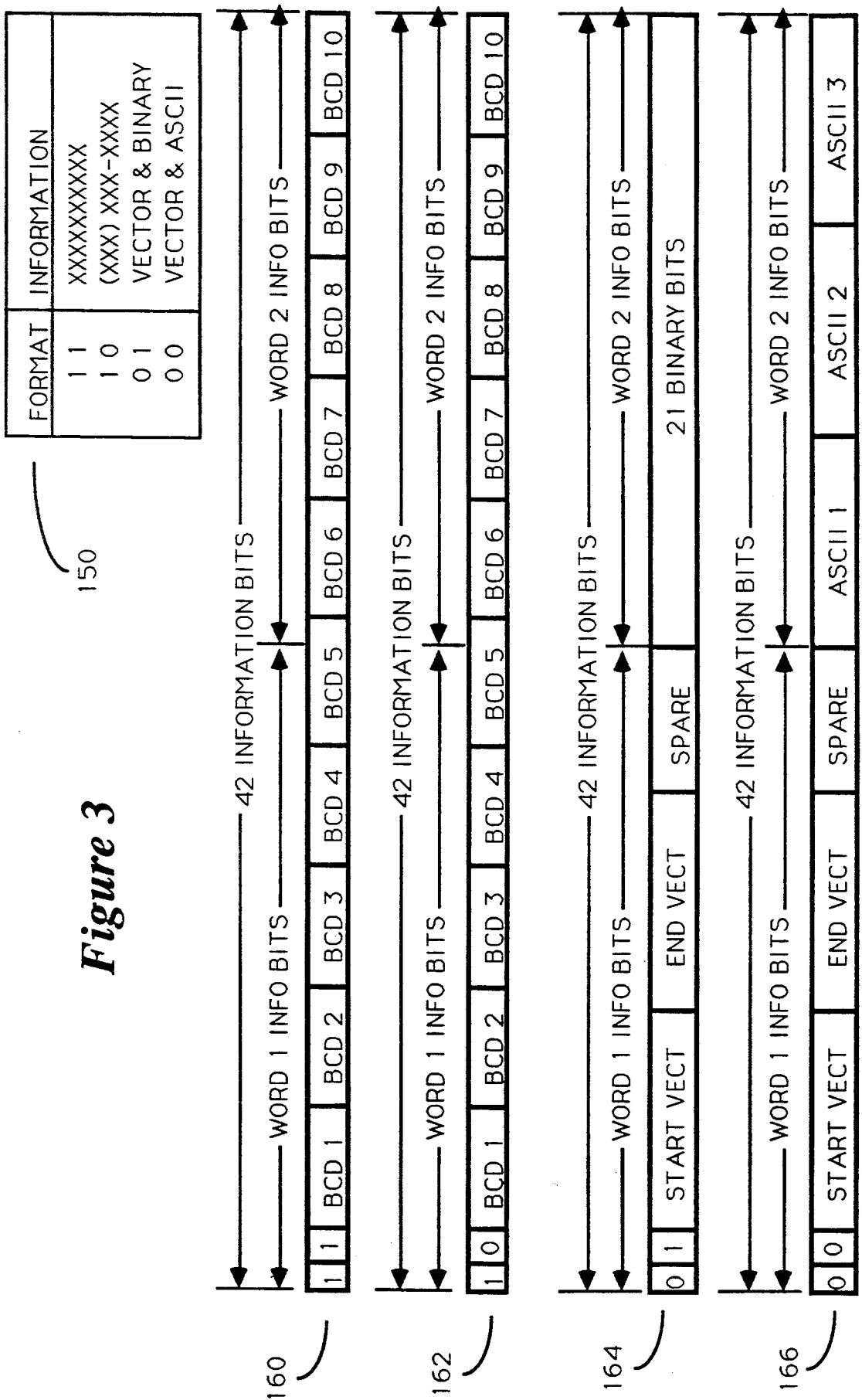
FIG. 3 shows the structure of the data packets within the first information field.

FIG. 3 shows the structure of the data packets within the first information field. Each data packet has two 32,21 words, thus each data packet has 42 bits of information. In the first portion of the information packet, a format signal indicates the structure of the information packet. In one embodiment, the format signal is the first two bits of the data packet. Table 150 shows four possible formats. A format signal of "11" indicates that the data packet contains ten unformatted BCD characters. The characters typically represent a telephone number. A format signal of "10" indicates that the data packet contains ten BCD characters, and the digits are to be displayed in a predetermined format. The predetermined format may vary from location to location or from paging receiver to paging receiver, or from pager address to pager address. For example, in the United States, the desired predetermined format may be "(XXX) XXX-XXXX". The "X"s represents the ten received BCD characters, and the format inserts an open parentheses character before the first character, and close parentheses and space characters between the third and fourth characters, and a dash character between the sixth and seventh characters. This provides for displaying of a fourteen-character message by a paging receiver while sending only ten BCD characters. An alternate format may insert a "dash" character between the third and fourth characters of a seven character message (XXX-XXXX).

The format may change from one country to the next. Additionally, in countries like Japan where a first city has a first telephone number format and a second city has a second telephone number format, both formats can be used by a single pager by assigning a first address to the first city and a second address to the second city. Thus, a "10" format signal associated with the first address causes the information to be displayed in the first format, and a "10" format signal associated with the second address causes the information to be displayed in the second format. The formats may be programmed into both a paging transmitter and the code plug of a paging receiver.

A format signal of "01" or "00" of FIG. 3 indicates that the first word contains a vector signal for identifying the position of message information in the second data field. In the one embodiment, the vector signal consists of a start vector and an end vector. The start vector indicating the position of the word in which the message information starts relative to the synchronization signal, and the end vector indicating the position of the word in which the message information ends. Alternate embodiments may use other methods for indicating the position of message information in the second data field including indicating the starting position of the message information and the number of words in the message, or the ending position of the message information and the number of words in the message, or the vectors may indicate a position relative to the data packet, etc. In a first embodiment, each vector consists of seven bits, in alternate embodiments, the number of bits in the vector signal may be adjusted. Thus, the first embodiment has vector signal of fourteen bits, and a two bit status signal. This leaves five spare bits available in the first word of the data packet. These spare bits may be used for a larger vector signal, additional parity, or reserved for flags for future use.

A format signal of "01" indicates that the second word in the data packet contains 21 bits of binary information. These bits are unformatted binary bits and may be used by the paging receiver as status flags, programming information, etc. A format signal of "00" indicates that the second word of the data packet contains three ASCII characters. It should be appreciated that the spare bits in the first word can further define the type of information in the second word of the data packet, as well as the type of information in the second data field which has been identified by the vector signal. The type of information may vary depending upon the type of message. ASCII is shown, but the type may be varied for Chinese character sets, graphic messages, digitized voice messages, etc.

Lines 160, 162, 164 and 166 shows the information format of the data packet corresponding to a format signal of "11", "10", "01", and "00", respectively. Note that in lines 160 and 162, BCD character 5 is split between two words. In alternate embodiments, additional BCD message formats may be assigned to format signals "01" and/or "00", thus eliminating one or both of the vector formats. Alternately, a format signal may indicate that the message continues in the following data packet.

Figure 4:
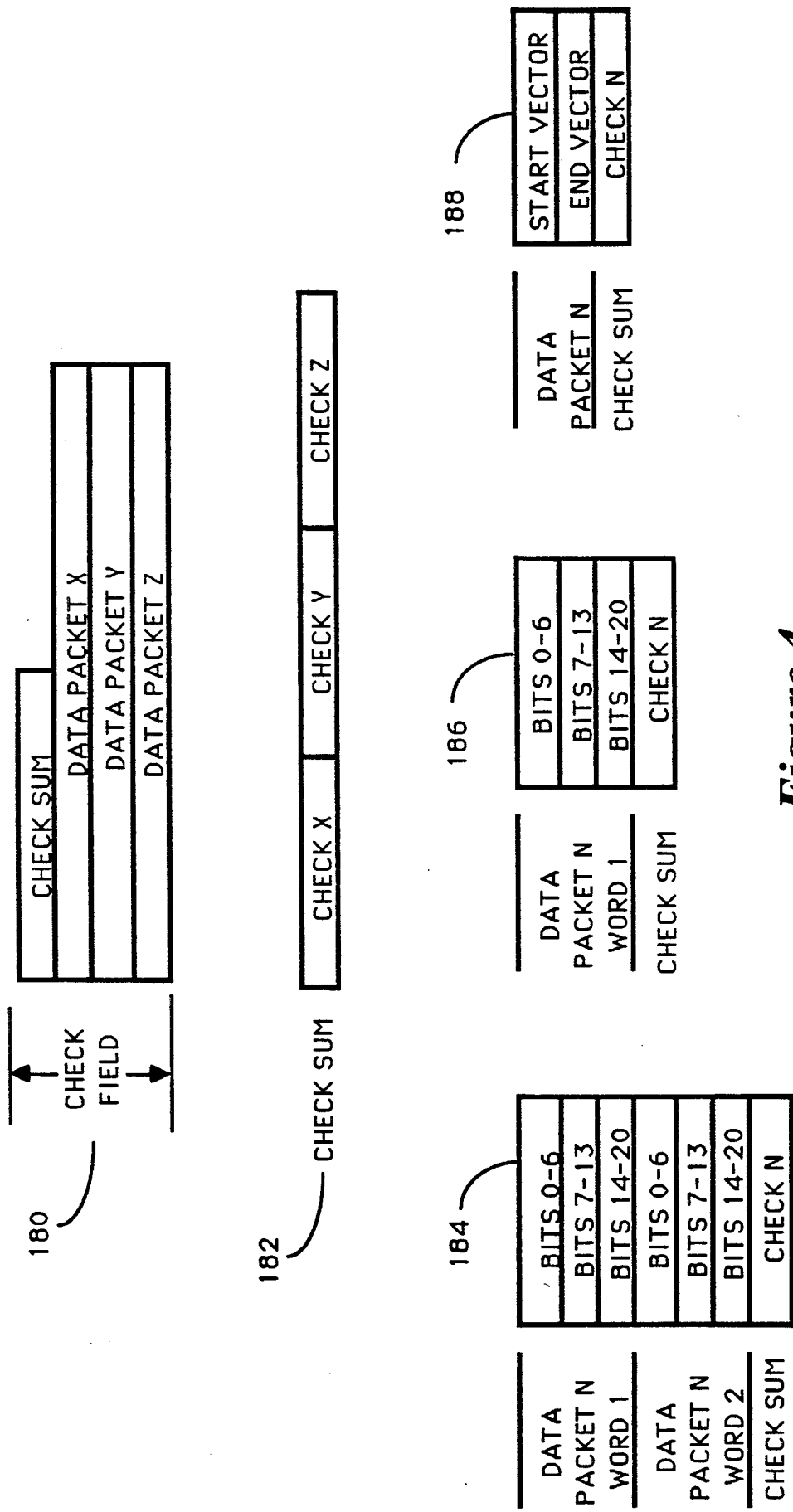
FIG. 4 shows the structure of the check field.

FIG. 4 shows the structure of the check field. As stated previously, a check field 180, consists of a checksum word and three data packets. The checksum word contains three seven-bit checksums 182, one checksum corresponding to each data packet. The checksum is a parity signal generated in response to information contained within the corresponding data packet. In one embodiment, the checksum is generated by dividing each word of the data packet into three seven-bit segments and totalling the checksum in response to all six of the segments. This is shown by 184. The checksum may be determined in any one of a variety of methods known in the art. This includes determining exclusive OR of the segments, or adding the segments. The checksum provides additional falsing detection to the information within the data packet. In an alternate embodiment 186, the checksum may be determined on only the first word of the data packet. This provides additional falsing protection on the information therein including the vector signal. Still further, falsing protection of the vector signal may be made by determining the checksum only on the basis of the vector signal as shown by 188.

In yet another embodiment, a first checksum 184 may be used on message information which is contained entirely within the data packet (formats "11" and "10"), and a second checksum 188 may be used if additional message information is contained within the second data field formats ("01" and "00"). Additional checksums may be distributed through the message information in the second data field as well as in the second word in the data packet. For example, the second word in the data packet of format 166 (FIG. 3) provides for the first three ASCII characters of a data message having a large number of ASCII characters. The second data field would contain the remaining ASCII characters within number words identified by the vector signal. Each word would provide for three ASCII characters. However, every ninth ASCII character would be substituted with a checksum of eight corresponding ASCII characters. The checksum could occur either at the beginning or end of the nine characters. In this way, the information in the second word of the data packet would either have or contain an associated checksum.

Thus, a check field includes a checksum word and a plurality of data packets, each data packet having a unique message. The checksum word has a corresponding plurality of portions, each portion having a checksum generated in response to the respective data packet. In the event the check field extends beyond the first data field, as in check field 121 of FIG. 1, the checksum information could be determined on the words within the second data field and be calculated in accordance with method 184 of FIG. 4.

The invention provides reduced overhead with respect to prior art signalling protocols. A series of ten-digit telephone number messages occupy five 32 bit words per message in the prior art POCSAG protocol. The invention provides the same message capability in three and one third words, one address word, one data packet (two words) and one third of a checksum word. Thus, the invention provides for sending such a message in 30% less bits. The invention additionally provides for twice as many individual addresses, as all twenty-one bits of information may be used to define an address. The check field provides for additional falsing protection not provided for in the prior art POCSAG system. Since addresses are grouped in a separate address field, pagers may process address information only in the address field and process data information only in the first or second data fields, thus address processing is not performed while data is being transmitted. Finally, this invention has the added advantage of using a single address for either numeric or alphanumeric messaging. The format signal in the data packet defines the type of information within the message. Prior art protocols use a first address for numeric messages and a second address for alphanumeric messages.

Figure 5:
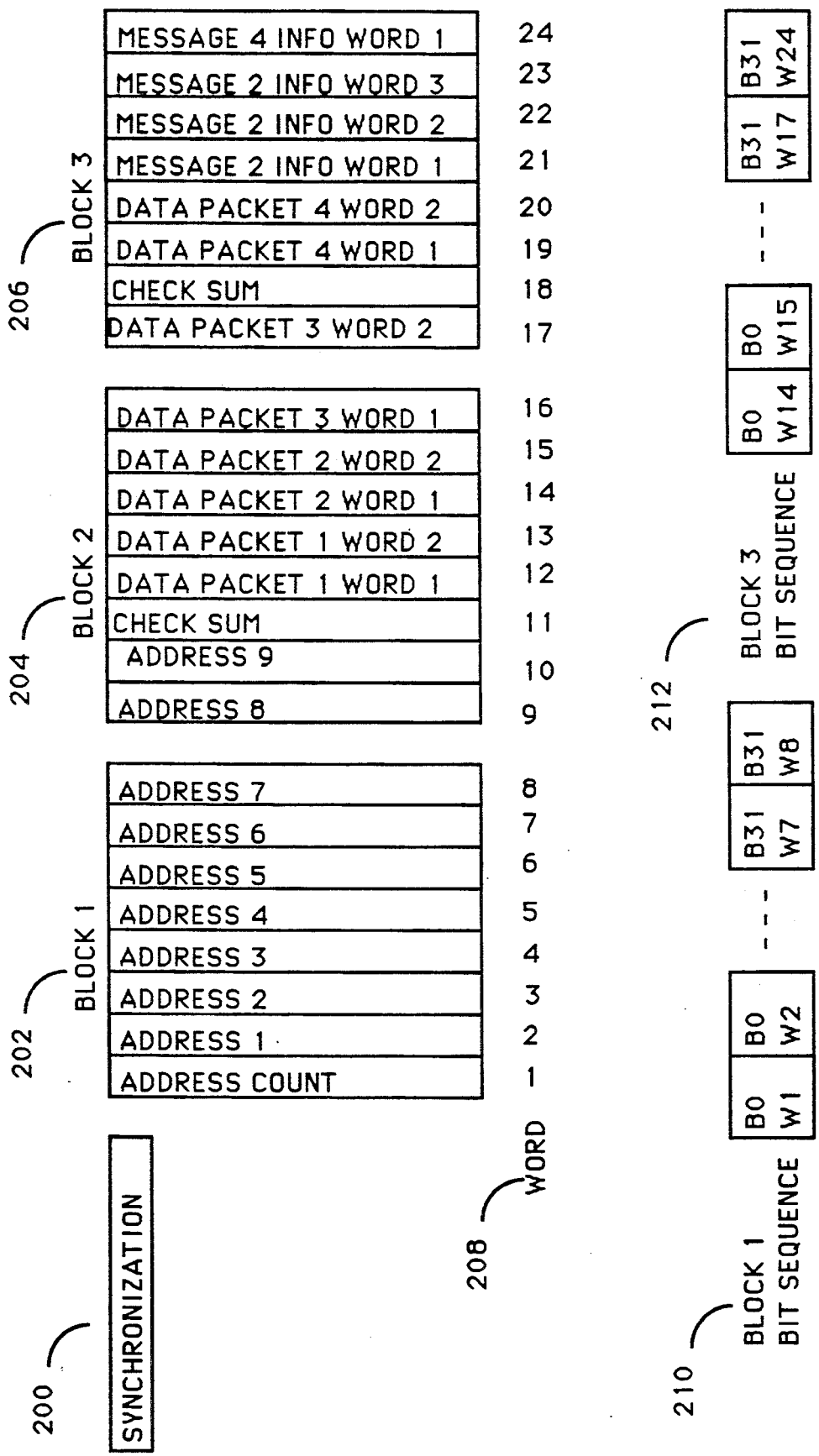
FIG. 5 shows the interleaving the message information.

FIG. 5 shows the interleaving of the message information. In an embodiment of the present invention, the message information is interleaved for improved protection in a signal fading environment. The synchronization signal is transmitted prior to the first interleaved block. The first block 202 contains an address count and seven addresses. The second block 204 contains an eighth address and a portion of the first data field and a portion of a check field. The third block 206 contains the remainder of the first data field, the remainder of the check field and the second data field. The position of each word relative to the synchronization signal is shown by 208. Each block consists of eight thirty-two bit words. Bit sequence 210 shows the bit transmission of the first block. Bit 0 of the first word is followed by bit 0 of the second word which is followed by bit 0 of each subsequent word until after bit 0 of the eighth word wherein bit 1 of the first word follows. The sequence continues until bit thirty-one of the eight word is transmitted. This completes the first block transmission. Thereafter, the second and third blocks are transmitted in a like sequence. The third block bit sequence is shown by 212. The number of words and interleaved blocks of a protocol transmission may be increased or decreased to provide for the amount of message to be transmitted.

An embodiment of the present invention provides for a predetermined number of interleaved blocks within a transmission. The transmission could be followed by a preamble signal and a subsequent predetermined number of interleaved blocks.

FIG. 6 shows a block diagram of a transmitter for generating a paging signal in accordance with the present invention. The transmitter operating in accordance with the present invention may be incorporated within a MODAX 500 radio paging terminal manufactured by Motorola, Inc., the assignee of present invention. Messages are received from a telephone network and accumulated in message accumulator 302. Analyzer 304 analyzes the messages accumulated in order to determine the aforementioned boundary signal, vector signals and format signals. The address field is generated by address field generator 306. Likewise, in response to analyzer 304, first and second data fields are generated by generators 308 and 310. The three fields and the boundary signal are interleaved by interleaver 312. Synchronization generator 314 generates periodic synchronization signals between which the message signal from interleaver 312 is interposed. Finally, the signal is frequency modulated and transmitted through transmitter 316 and radiated to a plurality of selective call receivers through antenna 318.

FIG. 7 shows a block diagram of a paging receiver operating in accordance with the present invention. The radiated signal is received by antenna 350 and demodulated by receiver 352. Synchronizer 354 synchronizes to the synchronization signal. Deinterleaver 356 then deinterleaves the demodulated signal in response to synchronization. Address field decoder 357, decodes the boundary signal, and in response to the boundary signal, decodes the address field within the deinterleaved signal for an address matching a predetermined address assigned to the paging receiver. In response to detecting a match, first data field decoder/receiver 358 receives and decodes the check field associated with the address from within the deinterleaved signal. The information from the data packet is extracted, and in response to a vector signal, second data field receiver 360 receives message information from the second data field. Analyzer 362 determines the operation of elements 354, 357, 358 and 360 in order to cause the paging receiver to process the signal according to the aforementioned description and also includes the pager code plug which contains at least one address assigned to the pager as well as a predefined format for display of numeric messages. Upon receiving a message, information from elements 358 and 360 are combined in order to form a message which is stored in message storage memory 364 and displayed on display 366. Receiver 352 additionally contains a battery saving means responsive to the analyzer in order to conserve battery power consumed by the paging receiver. It should be appreciated that in another embodiment, interleaver 312 of FIG. 6 and deinterleaver 356 of FIG. 7 may be eliminated while still realizing advantages of the invention. U.S. Pat. No. 4,860,003 issued Aug. 22, 1989 to DeLuca et al., assigned to the assignee of the present invention, provides an enabling description of a paging system performing similar functions and is hereby incorporated by reference.

Figure 8:
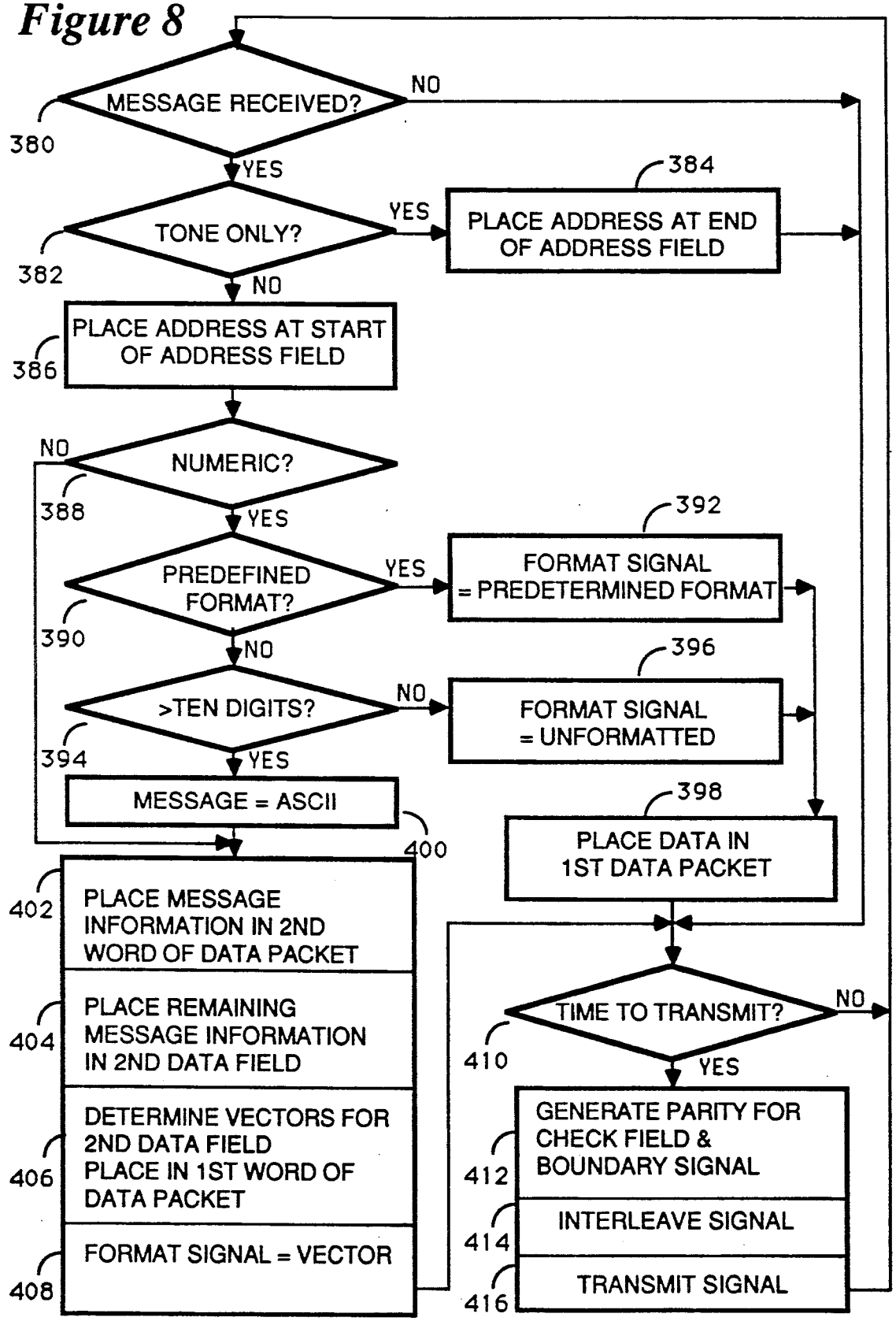
FIG. 8 shows a flowchart of a transmitter operating in accordance with the present invention.

FIG. 8 shows a flowchart of a transmitter operating in accordance with the present invention. The flowchart may be implemented within software operating within the paging terminal. Step 380 checks if a message has been received. If received, step 382 checks if the message is a tone only message. If true, step 384 places the address at the end of the address field. If false, step 386 places the address at the start of the address field. In either step 384 or 386, prior addresses may be moved toward the center of the address field. Step 388 checks if the message is a numeric message. If true, step 390 checks if the numeric message has a predefined format. If true, step 392 sets the format signal to correspond to the predefined format. If false, step 394 checks if the numeric message has greater than ten characters. If false, step 396 sets the format signal to correspond to the unformatted message. From either step 392 or 396, step 398 places the message data in the first data packet. If true, step 400 converts the numeric message to ASCII characters. From either step 400 or 388, step 402 places a portion of the message information in the second word of the data packet. Step 404 places the remaining message information in the second data field. Step 406 determines the vector signals corresponding to the placement of step 404, and step 408 sets the format signal to indicate that the data packet contains a vector signal. From either step 408, 398, 384, or 380, step 410 checks if it is time to transmit. This corresponds to either the expected occurrence of a synchronization signal or sufficient information accumulated to merit transmitting. If false, step 380 is again executed. If true, step 412 generates the parity signals for the check word in the check field. Step 414 then interleaves the signal, and step 416 transmits the signal. Step 380 is again executed. Thus, the flowchart of FIG. 8 describes generating the signal of FIG. 1.

Figure 9A:
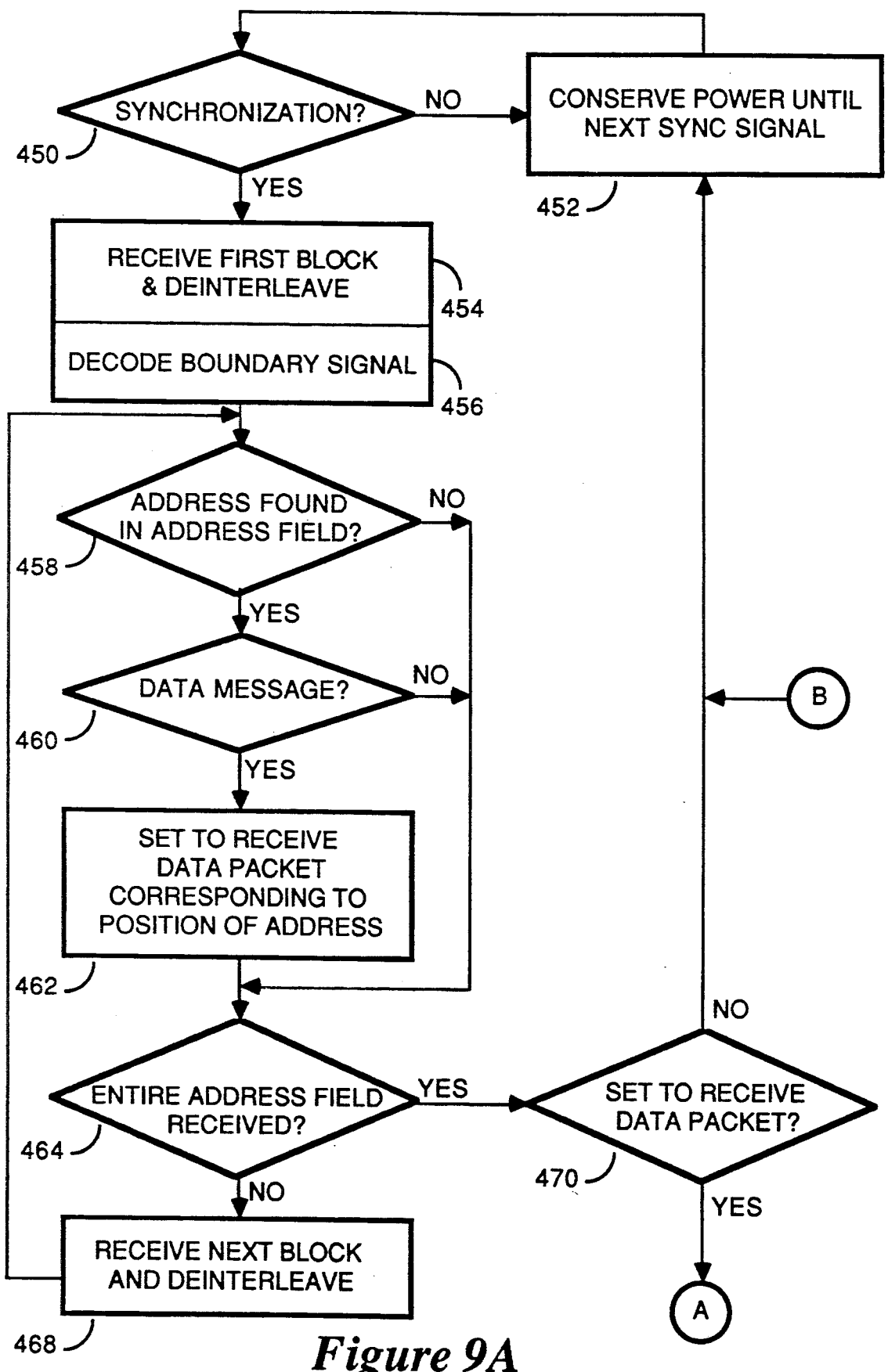
FIGS. 9A and 9B show a flowchart of a paging receiver operation in accordance with the present invention.
Figure 9B:
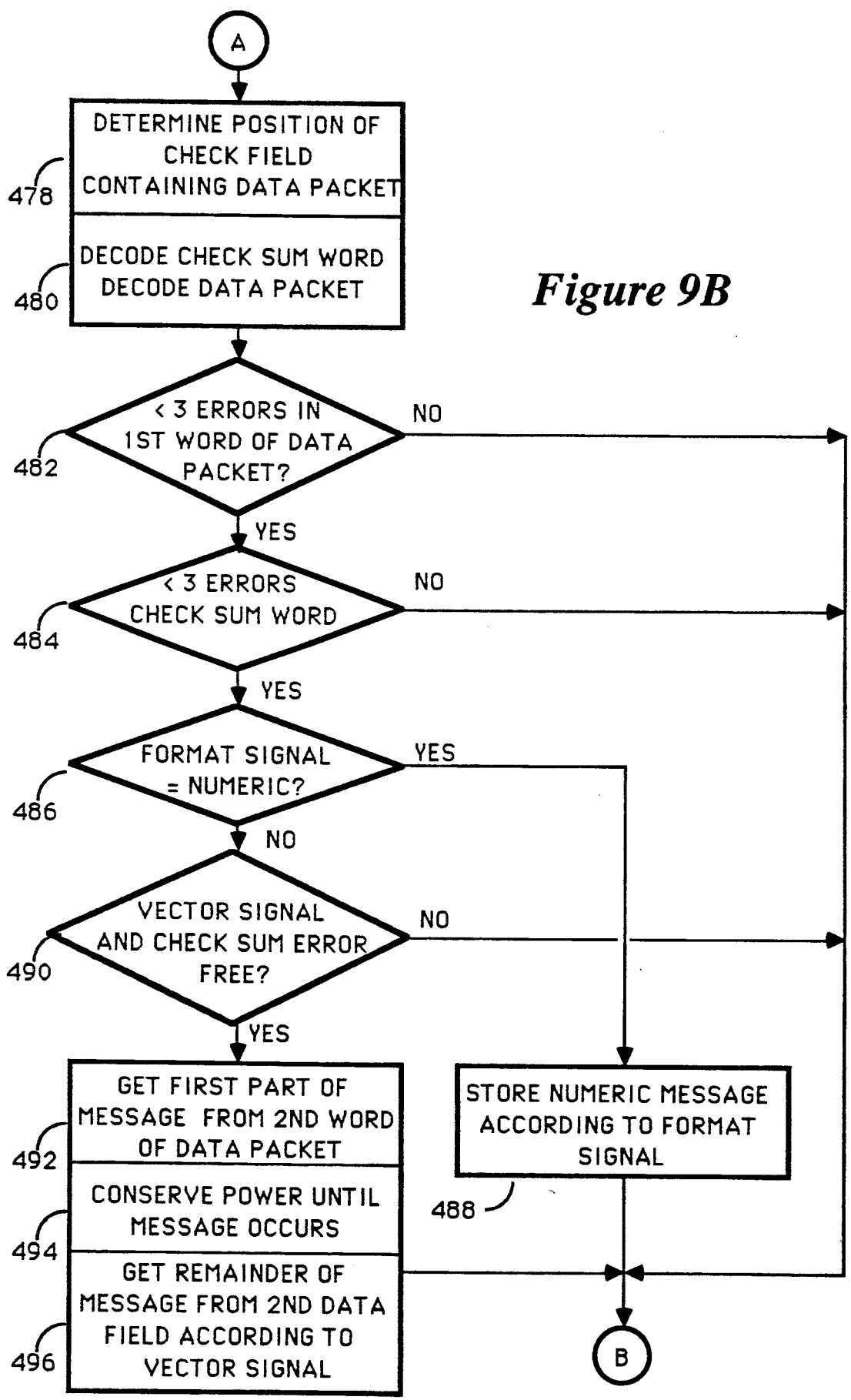

FIGS. 9A and 9B show a flowchart of a paging receiver operation in accordance with the present invention. The flowchart may be implemented in software operating within a microcomputer controlling the operation of a paging receiver. A description of a microcomputer based paging receiver is included in U.S. Pat. Nos. 4,755,816 and 4,851,829 both to DeLuca et al., which are hereby incorporated by reference. These patents, when combined with the disclosure herein, provide an enabling description of a pager operating in accordance with the present invention.

Step 450 of FIG. 9A checks if the sync signal has been received. If false, step 452 conserves power until the next expected occurrence of the sync signal. If true, step 454 receives and deinterleaves the first block. Then step 456 decodes the boundary signal which defines the address field. Step 458 checks if an address matching the address assigned to the receiver is found in the address field. If true, step 460 checks if the address corresponds to a data message. If true, step 462 determines the position of data packet related to the address by the position of the address and the boundary signal, and sets to receive the data packet. From either step 462 or the false result of steps 460 or 458, step 464 checks if the entire address field has been received. If false, step 468 receives and deinterleaves the next block and step 458 is again executed. If true, step 470 checks if step 462 has set the pager to receive a data packet. If false, step 452 is executed, thereby conserving power for the remaining blocks of the signal. If true, through connector "A", step 478 of FIG. 9B determines the position of the check field containing the data packet and receives and deinterleaves the corresponding block or blocks. Then step 480 decodes the checksum word and data packet from the check field. Step 482 checks if less than three errors are detected in the first word of the data packet. If true, step 484 checks if less than three bit errors were detected in checksum word. If either step 482 or 484 were false, the message has too many errors to decode and through connector "B", step 452 is executed. In response to a true result of step 484, step 486 checks if the format signal in the data packet corresponds to a numeric message. If true, step 488 stores the numeric message according to the format signal as previously described. In this step, the check signal from the checksum word may be used to detect errors in the numeric message. If the result of step 486 was false, step 490 compares the vector signal, and the check signal for errors. If an error is found, the integrity of the vector signal is compromised, the message is not decoded, and through connector "B", step 452 is executed. It should be noted that any of the check techniques of FIG. 4 may be used in this step. If the vector signal is error free, step 492 gets the first part of the message from the second word of the data packet. Then step 494 determines the position of the data in the second data field from the vector signal and conserves power by disabling the receiver until such an occurrence, thereby conserving battery power. Then in step 496, the blocks having the message information in the second data field are received and decoded, thereby, receiving the message. From either step 496, 488, 490, 484, or 482, step 452 of FIG. 9A is executed, thereby completing decoding of the signal.

It should be appreciated by those skilled in the art that many modifications may be made to the flowcharts of FIGS. 8 and 9 while remaining within the scope of the invention. In particular, a number of steps may be modified or deleted if the process of interleaving and deinterleaving were to be eliminated. Although such an elimination would reduce the protection of the signal from the fading noise environment, improved battery savings may be realized by eliminating the requirement to receive entire blocks of interleaved information. Alternately, the check word and use of the check word in the invention could also be eliminated, thereby improving overall efficiency of information communication while sacrificing falsing protection.

It will be generally appreciated that many other modifications to the above may be made without departing from the spirit and scope of the invention.

What is claimed is:

1. A method in a selective call receiver for receiving a message signal having a plurality of messages, each of said plurality of messages having an address signal and a related information signal having message information, said message signal comprising:
    an address field comprising a plurality of address signals;
    a first information field following said address field and having a plurality of data packets, each data packet being associated by position with one of said plurality of address signals; and
    a second information field following said first information field having a plurality of information signals located at a plurality of positions, wherein a vector signal included within one of the plurality of data packets within the first information field indicates the one of said plurality of positions of information signals within the second information field related to the one of the plurality of data packets within the first information field, the vector signal being included in the one of the plurality of data packets if the related information signal contains more than a predetermined amount of information and the vector signal not included in the one of the plurality of data packets and the related information signal entirely contained within the one of the plurality of data packets if the related information signal contains less than the predetermined amount of information, said method comprising the steps of:
    (a) determining presence of an address signal within the address field matching a predetermined address assigned to the selective call receiver;
    (b) determining the position of a data packet associated with the address signal matching the predetermined address;
    (c) receiving the data packet;
    (d) determining absence of said vector signal from within the data packet; and
    (e) recovering the message signal from the data packet in the absence of the vector signal.

2. The method of claim 1 wherein said first data field includes at least one check field having a check word and a plurality of data packets, the check word having an information portion and a parity portion generated in response to the information portion, wherein the information portion includes a plurality of parity signals corresponding to the plurality of data packets within said check field, and step (c) of receiving further includes the steps of:
    receiving the check work within said check field within which the data packet is contained;
    testing the data packet and the parity signal associated with the data packet to determine a parity error; and step (e) further includes the step of
    recovering the related message information from the data packet in the absence of the parity error.

3. The message signal according to claim 1 wherein a first data packet of said plurality of data packets in said first information field is associated with a first address signal of said plurality of address signals in said address field and wherein one of said plurality of data packets is associated with a corresponding one of said plurality of address signals, separated from the first address signal by a number of address signals equal to the number on data packets separating the one of said plurality of data packets from the first data packet.

4. The method of claim 1 wherein said message signal further comprises a boundary signal indicating a boundary between said address field and said first information field, and the method further comprises the step of receiving the boundary signal, and step (b) of determining further includes the step of determining the position of the beginning of the first information field in response to the boundary signal in order to determine the position of the packet associated with the address signal matching the predetermined address.

5. The message signal according to claim 4 wherein said boundary signal precedes said address field and said address field and said boundary signal are comprised within a plurality of codewords of predetermined length and said boundary signal corresponds to the number of said plurality of codewords within said address field.

6. The message signal according to claim 4 wherein said boundary signal is incorporated within every address signal, thereby providing a means to distinguish the address signals from signals within the first and second information fields.

7. The method of claim 4 further comprising the step of conserving power in response to the field of the address field if an address matching the predetermining address is not found in step (a) of determining.

8. A method for receiving a message signal having an address signal identifying a selective call receiver and a related information signal having message information, said message signal comprising:
  an address field comprising a plurality of address signals;
  a first information field following said address field, and having a plurality of data packets, each data packet being associated by position with an address signal; and
  a second information field following said first information field having a plurality of information signals; wherein a vector signal included within one of said plurality of data packets within the first information field indicates the position of a related one of said plurality of information signals within the second information field, the method comprising the steps of:
  (a) determining the presence of an address signal within the address field matching a predetermined address assigned to the selective call receiver;
  (b) determining the position of a data packet associated with the position of the address signal matching the predetermined address;
  (c) receiving the data packet and the vector signal therein;
  (d) determining the position of the related information signal within the second information field in response the vector signal; and
  (e) recovering the related information signal.

9. The message signal according to claim 8 wherein the one of said plurality of data packets additionally includes a portion of the related information signal.

10. The method according to claim 8 wherein the vector signal includes a beginning vector signal indicating the position of the beginning of the related information signal within the second information field and an end vector signal indicating the position of the end of the related information signal within the second information field and step (e) of recovering includes the step of receiving the message signal between the beginning and end positions and recovering the related information signal therefrom.

11. The message signal according to claim 10 wherein the message signal is comprised of a plurality of words having a predetermined number of bits, and wherein a boundary signal is comprised within one word, each address is comprised within one word, each information packet is comprised within two words, and the second information field includes a plurality of words, and further wherein the boundary signal corresponds to the number of words within the address field and the beginning vector signal includes a value corresponding to the number of words between the beginning of the address field and the beginning of the related information signal in the second data field.

12. The message signal according to claim 11 wherein the words contain 32 binary bits and are formatted into 32,21 BCH code words having 21 information bits and 11 parity bits.

13. The method of claim 8 wherein said message signal further comprises a boundary signal indicating a boundary between said address field and said first information field, and the method further comprises the step of receiving the boundary signal, and step (b) of receiving further includes the step determining the position of the beginning of the first data field in response to the boundary signal in order to determining the position of the data packet.

14. A method of communicating a message signal having a plurality of messages for reception by a plurality of selective call receivers, the method comprising the steps of:
  (a) accumulating a plurality of data messages to obtain a plurality of address signals and a plurality of information signals, each of said plurality of data messages comprising an address signal identifying a selective call receiver, and an information signal having message information;
  (b) grouping the plurality of address signals into an address field;
  (c) grouping the plurality of information signals into an information field;
  (d) generating a boundary signal defining a boundary between the address field and the information field; and
  (e) transmitting the address field, the information field and the boundary signal, wherein the address field is transmitted after the boundary signal and the information field is transmitted after the address field.

15. A method of communicating a message signal having a plurality of messages for reception by a plurality of selective call receivers, the method comprising the steps of:
  (a) accumulating a plurality of data messages to obtain a plurality of address signals and a plurality of information signals, each of said plurality of data messages comprising an address signal identifying a selective call receiver, and an information signal having message information;
  (b) accumulating at least one tone only message, a tone only message being entirely comprised within an address signal identifying one of said plurality of selective call receivers;
  (c) grouping the plurality of address signals into an address field in a predetermined manner such that ones of said plurality of address signals associated with data messages are grouped at one end of the address field and ones of said plurality of address signals associated with tone only messages are grouped at the opposite end of the address field;
  (d) grouping the plurality of information signals into an information field;
  (e) generating a boundary signal defining a boundary between the address field and the information field; and
  (f) transmitting the address field, the information field and the boundary signal.

16. The method of claim 15 wherein said step (c) of grouping comprises the step of grouping ones of said plurality of address signals associated with data messages at the beginning of the address field and ones of said plurality of address signals associated with tone only messages at the end of the address field.

17. A method of communicating a message signal having a plurality of messages for reception by a plurality of selective call receivers, the method comprising the steps of:
  (a) accumulating a plurality of data messages to obtain a plurality of address signals and a plurality of information signals, each of said plurality of data messages comprising an address signal identifying a selective call receiver, and an information signal having message information;
  (b) grouping the plurality of address signals into an address field;

(c) grouping the plurality of information signals into an information field wherein the information field comprises a first data field having a plurality of data packets corresponding to the first plurality of messages, and wherein the position of one of said plurality of data packets within the first data field corresponds to the position of a related address within the address field, and wherein each of said plurality of data packets contains a predetermined amount of message information, and wherein the information field further comprises a second data field, wherein the step (c) of grouping comprises the steps of:

(i) determining if the amount of information within an information signal is greater than the predetermined amount of message information;

(ii) incorporating the information signal within one of the plurality of data packets if the amount of information is less than or equal to the predetermined amount of message information;

(iii) including the information signal within the second data field if the amount of message information is greater than the predetermined amount;

(iv) generating a vector signal indicative of the location of the message information within the second field; and (v) incorporating the vector signal within the one of the plurality of data packets in the first data field;

(d) generating a boundary signal defining a boundary between the address field and the information field; and (e) transmitting the address field, the information field and the boundary signal.

18. The method of claim 17 further wherein the second data field contains message information for a plurality of selective cell receivers, said method further comprising the step of:

determining if within the second data field, at least a portion of the message for a first selective call receiver matches at least a portion of the message information for a second selective cell receiver; and wherein said step of including combines matching portions within the second data field.

* * * * *

UNITED STATES PATENT AND TRADEMARK OFFICE
CERTIFICATE OF CORRECTION

PATENT NO. : 5,128,665

DATED : July 7, 1992

INVENTOR(S) : DeLuca et al.

It is certified that error appears in the above-identified patent and that said Letters Patent is hereby corrected as shown below:

Column 12, line 64, delete "field" and insert --end--.

Signed and Sealed this

Tenth Day of August, 1993

Attest:

MICHAEL K. KIRK

*Attesting Officer*     *Acting Commissioner of Patents and Trademarks*